United States Patent
Singh

(10) Patent No.: US 7,450,655 B2
(45) Date of Patent: Nov. 11, 2008

(54) TIMING ERROR DETECTION FOR A DIGITAL RECEIVER

(75) Inventor: Suraj Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 10/625,062

(22) Filed: Jul. 22, 2003

(65) Prior Publication Data

US 2005/0018792 A1    Jan. 27, 2005

(51) Int. Cl.
*H04B 7/02* (2006.01)
(52) U.S. Cl. ................................... 375/267
(58) Field of Classification Search ............... 375/340, 375/326, 354, 355; 714/700, 746
See application file for complete search history.

(56) References Cited

U.S. PATENT DOCUMENTS

| | | | |
|---|---|---|---|
| 4,344,176 A * | 8/1982 | Qureshi ..................... 375/235 |
| 5,878,088 A | 3/1999 | Knutson et al. | |
| 5,943,369 A | 8/1999 | Knutson et al. | |
| 5,982,821 A * | 11/1999 | Kingston et al. ............. 375/326 |
| 6,278,746 B1 | 8/2001 | Velez et al. | |
| 6,477,215 B1 * | 11/2002 | Temerinac .................. 375/355 |
| 6,731,697 B1 * | 5/2004 | Boccuzzi et al. ............ 375/326 |
| 6,986,080 B2 * | 1/2006 | Kim et al. ................... 714/700 |
| 2003/0161393 A1 * | 8/2003 | Ahn .......................... 375/224 |
| 2006/0031275 A1 * | 2/2006 | Cannon ...................... 708/300 |

OTHER PUBLICATIONS

Floyd M. Gardner, "A BPSK/QPSK Timing—Error Detector for Sampled Receivers," IEEE Trans. Comm., vol. COM-34, No. 5, May 1986, pp. 423-429.

Floyd M. Gardner, "Interpolation in Digital Modems—Part I: Fundamentals," IEEE Trans. Comm., vol. 41, No. 3, Mar. 1993, pp. 501-507.

Lars Erup et al., "Interpolation in Digital Modems—Part II: Implementation and Performance," IEEE Trans. Comm., vol. 41, No. 6, Jun. 1993, pp. 998-1008.

* cited by examiner

*Primary Examiner*—Khai Tran
(74) *Attorney, Agent, or Firm*—Kacvinsky LLC

(57) ABSTRACT

A method and apparatus are provided for improved timing error detection.

36 Claims, 6 Drawing Sheets

TIMING ERROR DETECTION FOR A DIGITAL RECEIVER

BACKGROUND INFORMATION

Synchronization is an important task in any communication receiver. In a digital receiver, samples of the signal at symbol points (time instants) should be taken accurately and provided to a decision device, such as a Quantizer or Viterbi Decoder. Any substantial deviation or drift in the sampling instant should be tracked and corrected where possible by a timing recovery mechanism. This task of timing recovery may be difficult for multilevel modulation schemes such as Quadrature Amplitude Modulation (QAM) schemes, such as 16-QAM, 64-QAM, 256-QAM, etc.

One algorithm for timing error detection is presented in F. M. Gardner, "A BPSK/QPSK timing-error detector for sampled receivers" IEEE Trans. Comm., Vol. COM-34, no. 5, pp. 423-429, May, 1986. However, this type of timing error detector is useful only for measuring timing errors for modulation schemes in which the absolute value of symbol amplitudes remain constant, such as for Binary Phase Shift Keying (BPSK) and Quadrature Phase Shift Keying (QPSK), for example. There is a need for a timing error detector that can measure timing error for modulation schemes in which multiple levels or multiple amplitudes are used, such as QAM modulation schemes.

DETAILED DESCRIPTION

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

Figure 1:
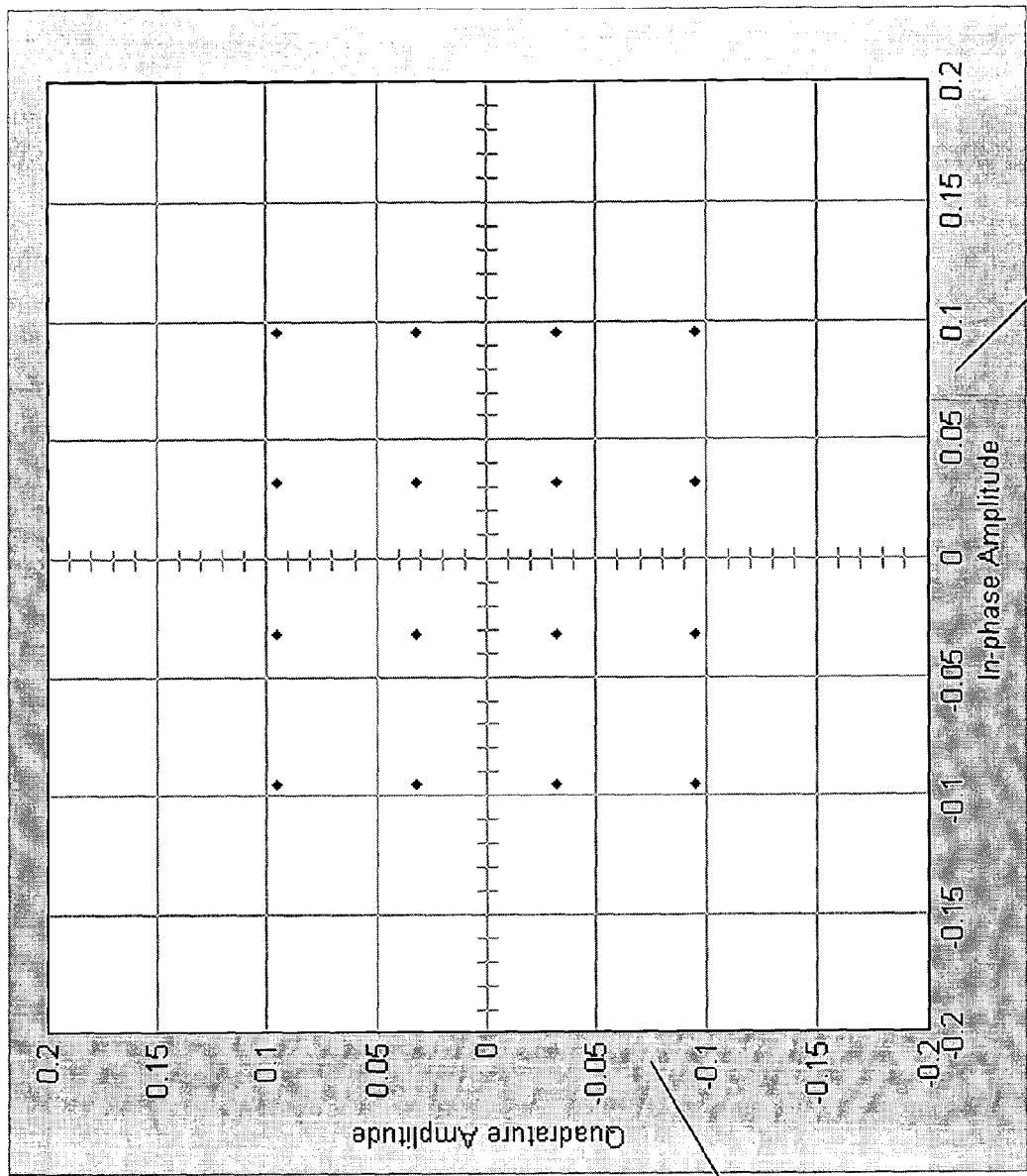
FIG. 1 is a diagram illustrating an example of a QAM constellation.

Referring to the Figures in which like numerals indicate like elements, FIG. 1 is a diagram illustrating an example of a QAM constellation. QAM may generally be a multilevel modulation scheme in which symbols having different amplitudes (levels) and phases can be used to encode multiple bits per symbol. Referring to FIG. 1, constellation 100 may be considered a QAM-16 constellation, since there are 16 different symbols 110 shown. The symbols shown in FIG. 1 may be for a quadrature transceiver, since each symbol includes values for both in-phase (I) and quadrature (Q) components, although the present invention is not limited thereto. The in-phase amplitudes are shown on the axis 132, while the amplitudes for the quadrature (Q) components are shown on axis 130. A symbol may be considered to be a waveform (e.g., electrical waveform) that can represent one or more bits. As shown in FIG. 1, the I and Q components of each symbol may be either positive values or negative values.

Figure 2:
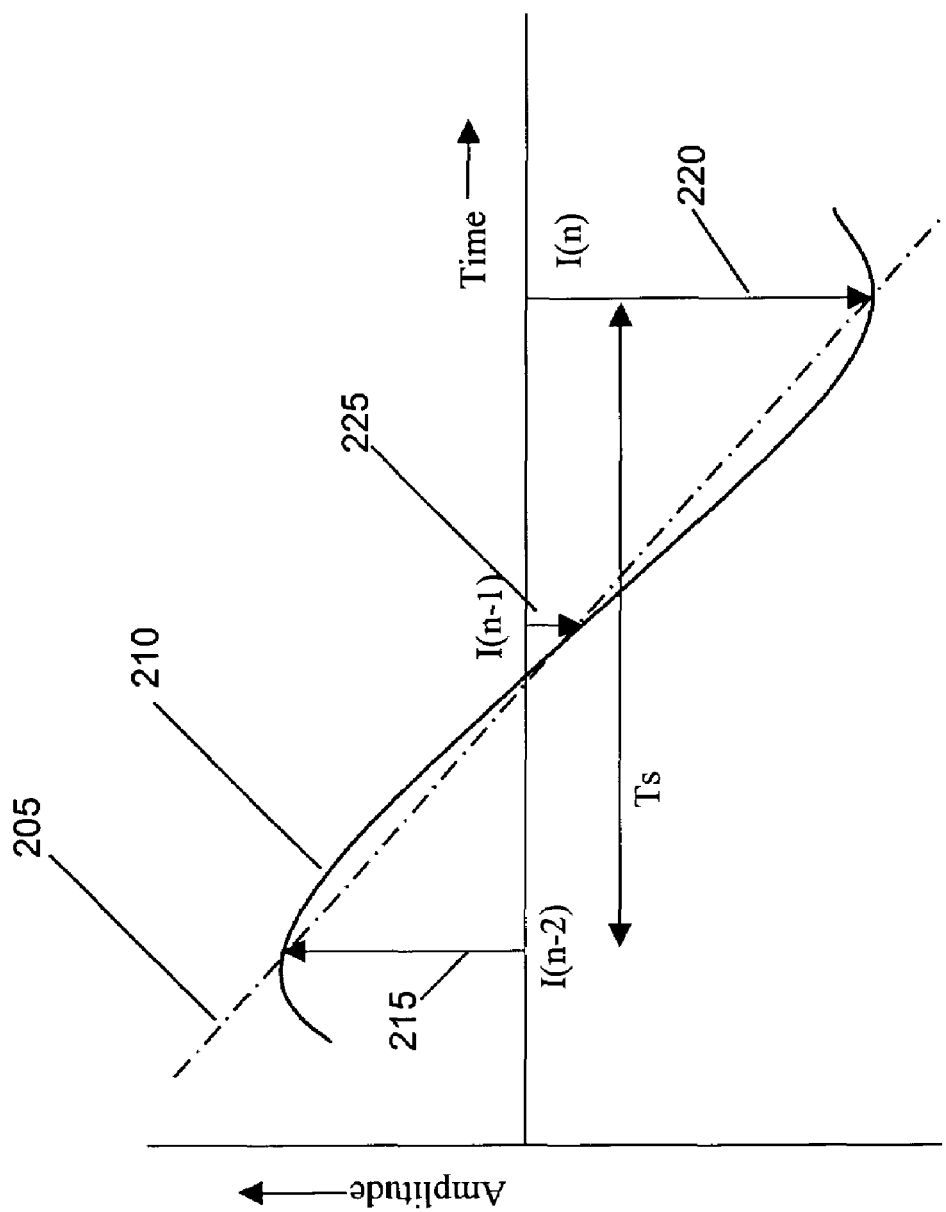
FIG. 2 is a block diagram illustrating symbol sampling points according to an example embodiment.

FIG. 2 is a block diagram illustrating various sampling points according to an example embodiment. A received electrical waveform 210 is shown. A symbol sample I(N-2) is taken for a first symbol at instant (or time) (N-2), and the value for this symbol sample is shown by arrow 215. Likewise, a second symbol sample I(N) is taken at a second symbol at instant (N), and the value of this second symbol value is represented by arrow 220. The in-phase or I values are shown in FIG. 2, but this is only as an example. According to an embodiment, symbol samples I(N-2) and I(N) may be symbol samples for consecutive symbols. An intersymbol sample I(N-1) may be taken at instant (N-1), and the value of this intersymbol sample I(N-1) is represented by arrow 225. Also, the intersymbol sample I(N-1) is taken at an instant, (N-1), that is between the two symbol samples I(N-2) and I(N). The various symbols and symbol samples shown in FIG. 2 and described herein are provided only as an example, and the present invention is not limited thereto.

According to an embodiment, a symbol sample may be a sample taken on a symbol sampling point. The symbol sample may be sent to a decision device to determine the value for the symbol, although the invention is not limited thereto. In some cases, there may be only one symbol sample per symbol. In another embodiment, there may be more than one symbol sample per symbol. In one embodiment, an intersymbol sample may be a sample taken anywhere between two symbol samples. According to an example embodiment, there may be one or more intersymbol samples, and these values may not be sent to a decision device, but may be used for other purposes. In yet another example embodiment, an intersymbol sample may be taken approximately mid-way (or half way) between two successive symbol samples, although the present invention is not limited thereto.

Referring to FIG. 2, it can be seen that the first symbol value I(N-2) is a positive value, and the second symbol sample is a negative value (for these particular example symbols). According to an example embodiment, the transition of the waveform 210 from one symbol sample to the next symbol sample may be approximated as a substantially linear transition, or a straight line, although the present invention is not limited thereto. This linear approximation of waveform 210 between symbol samples is shown as straight line 205 in FIG. 2.

Thus, according to an embodiment, the value of an intersymbol sample that may be taken, for example, approximately at a midpoint (or mid-way) between the two symbol samples should have a value that is approximately mid-way between those two symbol samples (or the average of those to symbol samples), if there is no timing error. Thus, based on this linear approximation 205 for the waveform 210 between symbol samples, the value of two symbol samples and the value of the intersymbol sample between the two symbol samples may be used to calculate a timing error, although the present invention is not limited thereto. Various example embodiments for this type of timing error measurement technique are described in greater detail below, with reference to FIGS. 3-6, although the present invention is not limited thereto.

Figure 3:
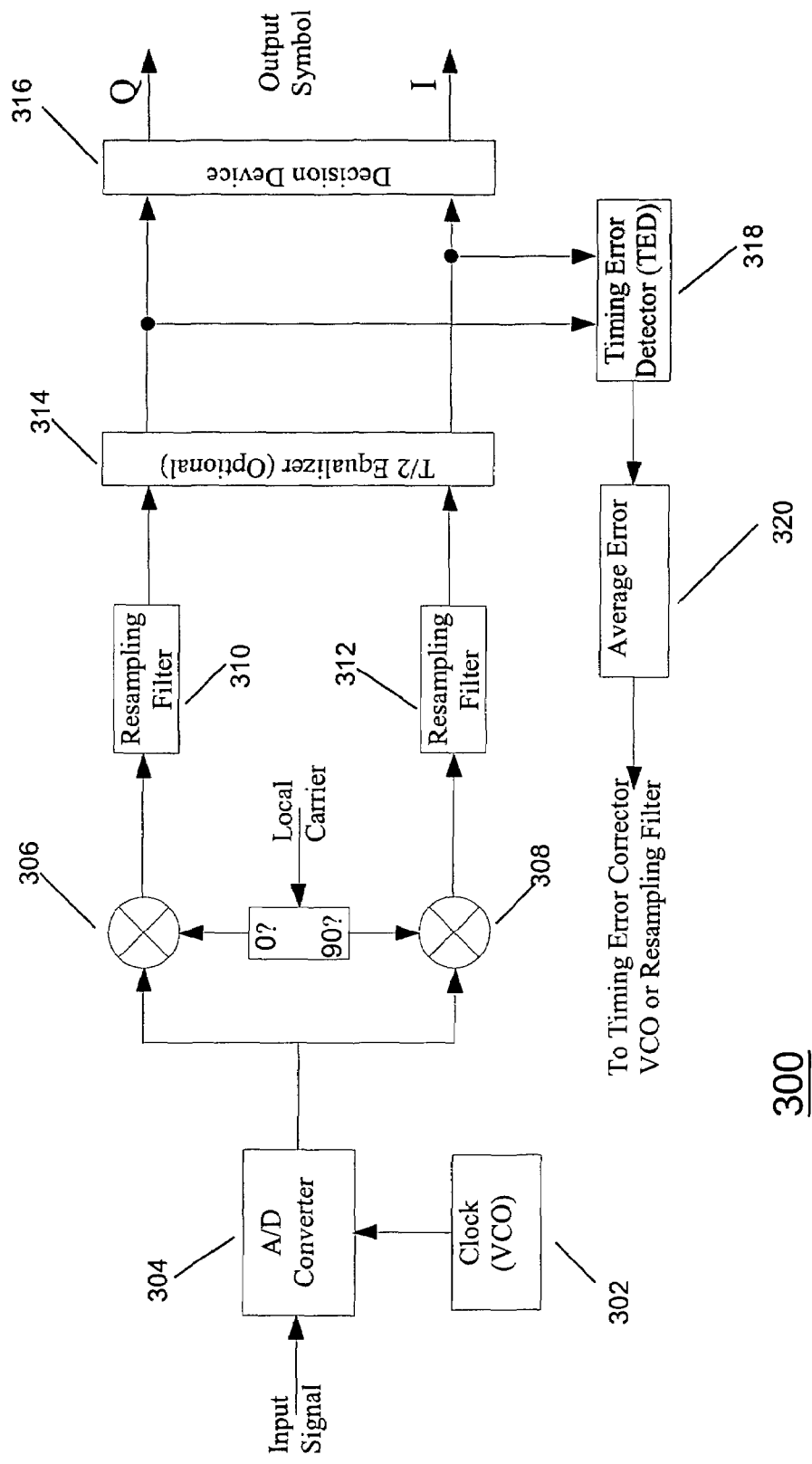
FIG. 3 is a simplified block diagram of a demodulator according to an example embodiment.

FIG. 3 is a block diagram of a demodulator according to an example embodiment. Demodulator 300 receives an analog input signal 301, which is input to an analog-to-digital (A/D) converter 304. An adjustable clock 302 (which may be a voltage controlled oscillator or other circuit) controls the sampling points for A/D converter 304. A/D converter 304 outputs a passband or intermediate frequency (IF) digital signal.

The digital signal from A/D converter 304 is input to mixers 306 and 308. A local carrier is generated using one of several well known techniques. A carrier recovery circuit may be used to recover the carrier based on the received signal, for example. The carrier is input to mixer 306, and a version of the carrier shifted by 90 degrees is input to mixer 308. Mixer 308 outputs an in-phase (I) baseband signal, while mixer 306 outputs a quadrature (Q) baseband signal. Thus, it can be seen that in this example, demodulator 300 is a quadrature demodulator due to the I and Q data signals, although the present invention is not limited thereto.

The I and Q data signals may then be input to low-pass resampling filters 312 and 310 respectively. The low-pass resampling filters 310, 312 may be used to perform interpolation and/or to adjust the timing of symbol sampling. Next, the I and Q data signals may be input to a equalizer 314 to equalize the signals, and then input to a decision device 316, although the present invention is not limited thereto. Decision device 316 may determine the actual (or hard) symbol (see actual symbols of FIG. 1 for example) based on the measured (or soft) symbol value (measured I and Q data signals). As an example, if the measured symbol value is 3.1, the decision device 316 may determine that the actual symbol is a value of 3.0, which is the closest symbol (in this example). Thus, according to an embodiment, a measured or soft symbol value may refer to the measured value (which can be almost any value), while the actual or hard symbol value may refer to one of the specific symbol values according to the applicable constellation (typically the actual symbol value that is nearest to the measured value), although the present invention is not limited in this respect.

According to an example embodiment, the demodulator 300 may also include a feedback loop for adjusting the timing of symbol sampling based on measured timing error. A timing error detector (TED) 318 may receive the I and Q data signals and may measure or detects an amount of timing error for symbol sampling for the current symbol. According to an example embodiment, TED 318 may measure timing error for both I and Q signals, resulting in an I and Q timing error values, although the present invention is not limited in this respect. According to an example embodiment, the measured timing error (e.g., for the current sample) may be input to an averaging circuit 320 to calculate an average of the timing error over a time period or over a plurality of symbols. A correction or adjustment may be applied to the timing of symbol sampling based on the instantaneous timing error or the average timing error. This timing adjustment may be performed, for example, by adjusting the clock 302 and/or adjusting/applying a correction to the resampling filters 320, based on the measured timing error. While the TED 318 is shown as measuring timing error for I and Q signals (quadrature transceiver), the present invention is not limited to a quadrature transceiver.

Figure 4:
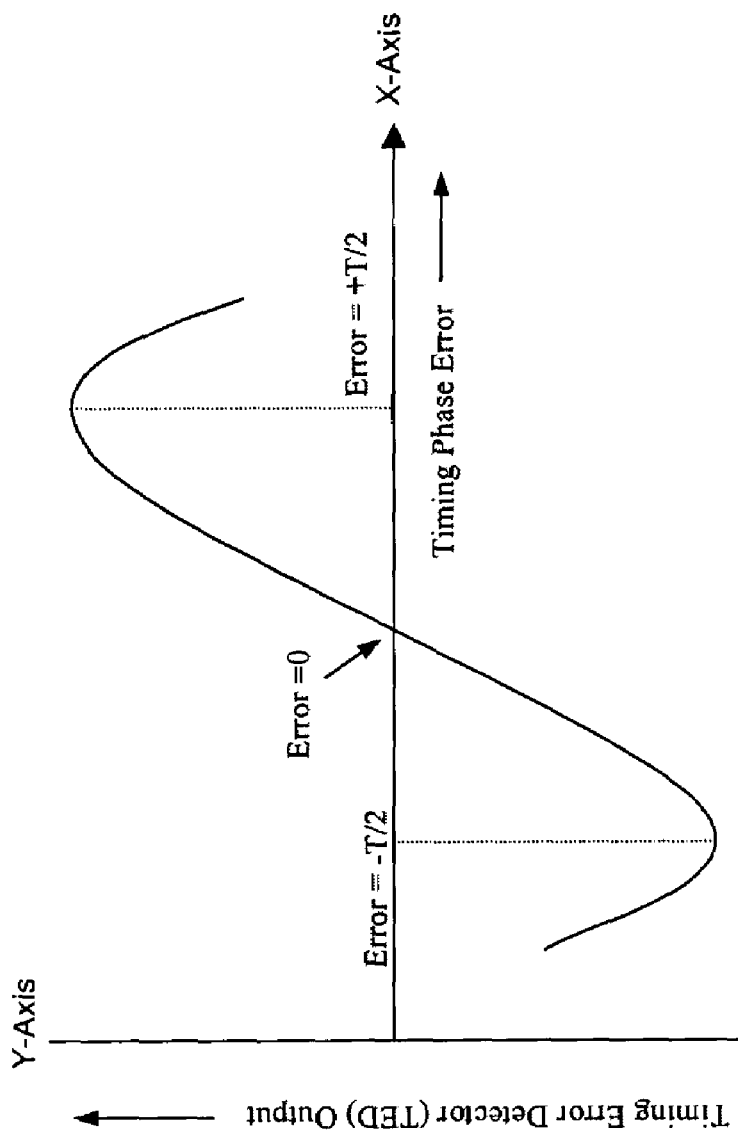
FIG. 4 is a diagram illustrating an output of a timing error detector (TED) according to an example embodiment.

FIG. 4 is a diagram illustrating an output of a timing error detector (TED) according to an example embodiment. As shown in FIG. 4, the X-axis represents timing phase error, while the Y-axis represents the TED output. A zero timing error preferably results in TED 318 outputting a zero error value, as shown in FIG. 4. Also, an increasing positive timing error results in an increasingly positive TED output, while an increasingly negative timing phase error results in an increasingly negative TED value. Maximum error values may be output from TED 318 when the timing phase error (or timing error) is equal to T/2 and −T/2, according to an embodiment. This is just one example of how a TED may be set up to output values that correspond to specific timing errors (or timing phase errors), and the present invention is not limited thereto.

Figure 5:
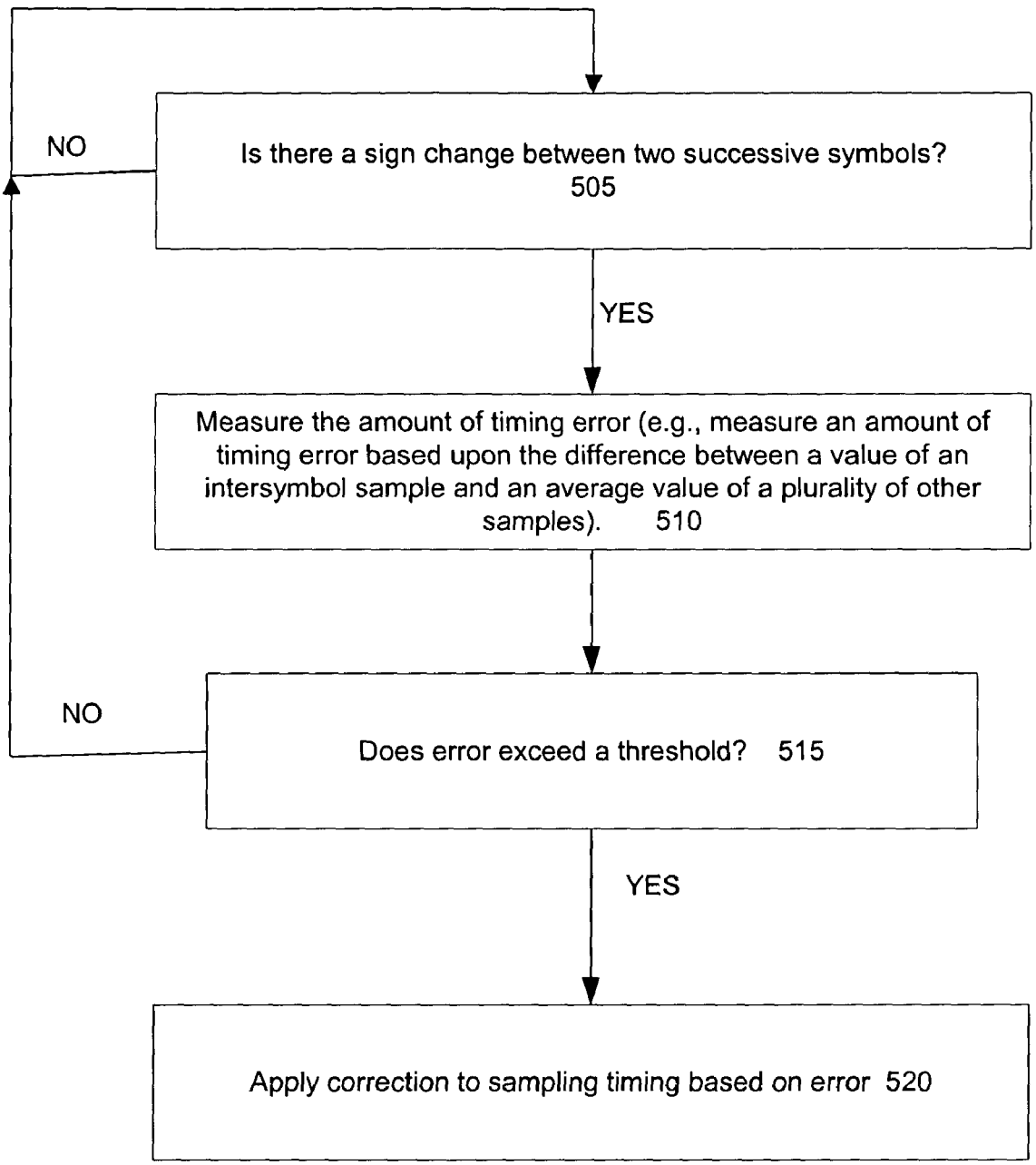
FIG. 5 is a flow chart illustrating operation of a timing error detector according to an example embodiment.

FIG. 5 is a flow chart illustrating operation of a timing error detector according to an example embodiment. At 505, demodulator 300 determines whether there is a sign change for symbol values for two successive symbols. This preferably determines whether there is a sign change from a sample of a first symbol to a sample of a second symbol. The sign change can be positive to negative, or negative to positive. If there has been a sign change, then the process moves to 510. The present invention is not limited to cases in which there is a sign change between symbol samples. Therefore, in some cases, block 505 may be omitted.

As noted above in FIG. 2, waveform 210, extending between symbol samples, may in some cases be approximated as a straight line 205 (FIG. 2), and this expected linearity may be greater when there is a sign change for successive symbols. Thus, according to an embodiment, the timing error calculation as described herein, in some cases, may be more accurate when there is a sign change between successive symbols, although the invention is not limited thereto.

At 510, the TED 318 measures or detects an amount of instantaneous timing error (also known as timing phase error) for the symbol at that point. The instantaneous timing error may be measured a number of different ways.

At 515, an average error may be calculated. This may be, for example, an average timing error over a period of time or over a period of samples. Block 515 may be optional.

At 520, if the error (e.g., either average error or instantaneous error for a particular sample) exceeds a threshold, a correction or adjustment may be made to the timing of the symbol sampling based upon the detected timing error.

There are a number of different ways to measure timing error, as noted in 510. In an example embodiment, TED 318 may detect an amount of timing error based upon at least a portion of a sum of the values for first and second symbol samples, as compared to a value of an intersymbol sample between the first and second symbol samples, although the present invention is not limited thereto. The portion of a sum may refer to, for example, a portion (e.g., 50%) of the sum of I(N-2)+I(N). Another percentage or portion of the sum can be used as well.

In another embodiment, the TED 318 may detect an amount of timing error based upon a value of an intersymbol sample as compared to an average (or portion of average) of a plurality of other samples. This may be performed, for example, by measuring an amount of timing error based on the difference between a value of an intersymbol sample and an average value of a plurality of other samples (such as symbol samples). Thus, according to an embodiment, if the value of the intersymbol sample is greater than or less than the average of the plurality of symbol samples, this difference may be referred to as the timing error, although the present invention is not limited thereto.

According to an embodiment, the transition from the first symbol to the second symbol may be estimated to be approximately linear, at least in some cases. In the absence of timing error, the intersymbol value (e.g., I(N-1)) should be approximately equal to the average of the two symbol samples because the transition from the first symbol value I(N-2) to the second symbol value I(N) may be considered to be approximately linear, at least in some cases.

As an example, the intersymbol sample (e.g., I(N-1)) may be measured at a sampling point that is approximately between (or even approximately mid-way between) the first and second symbols (or symbol samples), although the present invention is not limited thereto. In the absence of timing error, the intersymbol value (e.g., I(N-1)) should be equal to the average of the two symbol samples because the transition from the first symbol value I(N-2) to the second symbol value I(N) may be considered to be approximately linear, at least in some cases.

For example, a value of a first symbol sample I(N-2) may be 2, and a value of a second symbol sample I(N) may be −3. Thus, due to the estimated substantial linearity of the waveform between symbol samples, the value of an intersymbol sample (e.g., I(N-1) in FIG. 2) that may be approximately mid-way between the two other samples (e.g., I(N-2), I(N) in FIG. 2) should have a value that is approximately mid-way between those two sample values if there is no timing error, although the present invention is not limited thereto. Therefore, in this example, the intersymbol sample (e.g., I(N-1)) may be expected to have a value that is (2−3)/2=−½ (which is the average of the first and second symbol samples). A deviation of the intersymbol value from this expected value is an indication of timing error (or timing phase error).

Such a timing error calculation may also be performed when there is no sign change in symbol samples. In such a case, the intersymbol value may still be the average of the two symbol sample values since the symbol transition may be assumed to be approximately linear. However, this type of error measuring technique may be particularly advantageous when there is a sign change between two successive symbol samples, since there may be greater linearity in the symbol transition in such case, although the present invention is not limited thereto. Similar operation may be done for Q (quadrature) samples and both errors (I and Q) may be added together to form a total error, and which may represent a better average error.

The example embodiments described above are explained where there is 2 samples per symbol (e.g., samples taken every T/2), as shown in FIG. 2. However, this is simply an example, and the present invention is not limited thereto. In many cases, if there are an even number of samples taken per symbol (e.g., 2, 4, 6, 8, . . . ) such as described above, there will typically be an intersymbol sample taken between two symbols (e.g., approximately mid-way between two successive symbol samples). In those cases, the intersymbol sample may be a measured value (as one of the samples). However, in cases where there is no intersymbol sample that is taken or measured approximately mid-way between two symbol samples, such as for odd number of samples per symbol, the intersymbol sample may be predicted or estimated on the basis of other samples using interpolation. For example, an intersymbol sample at approximately mid-way between the two successive symbol samples may be interpolated based upon two or more intersymbol samples. Once the interpolated or estimated intersymbol value is calculated, this intersymbol value may be used to detect or measure timing error in the same fashion as described herein, although the present invention is not limited thereto.

The following is example pseudocode that describes an operation of a TED according to yet another embodiment. The timing error for I and Q sides (I and Q signals) may be separately detected and then added together to obtain a total error, although the present invention is not limited thereto. If the error exceeds a threshold, then a correction or timing adjustment may be applied based on the measured timing error.

Example Pseudocode:

```
If (I(n−2)*I(n) < 0) (check to see if there is a sign change for two succcessive symbol samples for in-phase signal)
    {
        There is a Sign change in I component
        E_I(n) = Sgn[I(n)]*[I(n−1) − {I(n−2) + I(n)}/2]
        (Eqn. 1)
        AccError = AccError + E_I(n)
    }
If (Q(n−2)*Q(n) < 0) (check to see if there is a sign change for two successive symbol samples for quadrature signal)
    {
        There is a Sign change in Q component
        E_Q(n) = Sgn[Q(n)]*[Q(n−1) − {Q(n−2) + Q(n)}/2]
        (Eqn. 2)
        AccError = AccError + E_Q(n)
    }
if(AccError > Threshold)
    {
        Apply correction
        Delay the samples
        ACCError = 0
    }
if(AccError < Threshold)
    {
        Apply correction
        Advance the samples
        ACCError = 0
    }
```

The pseudocode above describes an example timing error detection algorithm for a quadrature demodulator, although the invention is not limited thereto. According to this embodiment, first, it is determined whether there is a sign change from the first symbol sample to the second symbol sample. In this example, the first and second samples may be I(N-2) and I(N). However, as noted above, the various timing error detection techniques described herein are not limited to instances in which there is a sign change for successive symbols. The pseudocode represents an example embodiment, and the invention is not limited thereto.

Referring to the example pseudocode above, if there is a sign change, then an error signal $E_I(n)$ is calculated, which is the timing error for the in-phase data signal I. According to Eqn. 1, $E_I(n)=\text{Sgn}[I(n)]*[I(n-1)-\{I(n-2)+I(n)\}/2]$. The portion of this equation, $\{I(n-2)+I(n)\}/2$, may be referred to as the amount of timing error. I(N-2) and I(N) may be referred to as the two samples for successive symbols (two successive symbol samples). I(N-1) may be referred to as an intersymbol value, which may be taken, for example, approximately mid-way between the two symbol samples $\{I(n-2)+I(n)\}/2$ in Eqn. 1 may be referred to as the average of the two samples for successive symbols (I(N-2), I(N)). Due to the expected substantial linearity of the waveform through the symbol transition, the intersymbol value (e.g., I(N-1)) should be approximately equal to this average of these two symbol sample values, in the absence of timing error, according to this example embodiment. Thus, the difference between this intersymbol value (I(N-1) and the average of the other two symbol samples, $[I(n-1)-\{I(n-2)+I(n)\}/2]$, may be referred to as the amount of timing error.

As shown in Eqn. 1, this calculated amount of timing error is multiplied by the sign of the current sample, I(N), to sign normalize the timing error. This is to ensure that the sign of the timing error will match the sign convention for timing error, as shown in the timing diagram of FIG. 4. However, this is merely a sign convention, and the invention is not limited thereto. According to an example sign convention, a timing error output of zero may mean that the symbol(s) are being sampled at approximately the correct time instant. A positive timing error may indicate that the samples are being sampled ahead of time (leading), and a negative timing error may indicate that the samples are being sampled behind in time (lagging). However, this is merely a sign convention.

Referring to the pseudocode again, the in phase error signal $E_I(n)$, may be added to the accumulated error total, AccError=AccError+$E_I(n)$, although the invention is not limited thereto. This same type of error calculation may be repeated for the quadrature data signal Q, as shown by Eqn. 2 above in the pseudocode, to calculate $E_Q(n)$. Therefore, in the example embodiment, this may result in a total error being calculated as AccError=AccError+$E_I(n)$+$E_Q(n)$, where AccError is the accumulated error. The error may also be filtered with a low pass filter.

According to another example embodiment, if the accumulated error exceeds a positive threshold, then a timing correction may be applied based on this error to delay the symbol sampling. On the other hand, if the accumulated error exceeds a negative threshold, then a correction may be applied based on this error to advance the symbol sampling. The accumulated timing error is then reset to zero before repeating the process. This represents an example embodiment, and the invention is not limited thereto.

One or more embodiments of the timing error detection technique described herein may be used to correctly measure timing error when there is a sign change between symbols, as well as when there is an amplitude change in symbols, or both. In some cases, one or more of the various timing error detection techniques described herein may use an expected linearity of the waveform during symbol transition. Thus, according to an example embodiment, timing error may be detected even when there is a sign change, an amplitude change and/or a combination of the two. Therefore, the various techniques described herein for timing error detection may advantageously be used for a wide variety of modulation schemes, including BPSK, QPSK, GMSK as well as for modulation schemes which use multiple amplitude levels, such as 8-PSK, QAM and others.

As noted above, measured (or soft) symbol values may refer to measured samples, which may be 3.15, or 1.17, as examples. On the other hand, the actual (or hard) symbol values may refer to one of the specific symbol values (such as 1, 2, 3) according to the applicable constellation. A decision device, in some cases, may select an actual or hard value that most closely matches the measured or soft sample. Not all of the samples may be converted into hard or actual samples. In one embodiment, only the symbol samples may be sent to the decision device to obtain a hard symbol. For example, in some cases, Intersymbol samples may not be sent to the decision device.

According to yet another example embodiment, the demodulator and TED may operate in two different modes of operation. In an acquisition mode, a timing error may be detected based on measured intersymbol samples and measured symbol samples. Thus, in the Eqn. 1 and Eqn. 2 noted above, all the values may be measured or soft values during acquisition mode, according to an embodiment. However, in a tracking mode, the measured intersymbol sample value may be used, but the hard or actual symbol sample values may be used since these values may be available from the decision device.

According to an example embodiment, the demodulator may include a Phase lock loop or Baud Lock Loop (BLL), where it operates in acquisition mode to acquire the lock at baud frequency. Once it acquires lock, it then switches to track mode (where hard or actual symbol values are use). If any loss of lock is detected by equalizer 314 (e.g., by analyzing the mean square error or MSE), the demodulator may switch back to acquisition mode. In the acquisition mode, the received or measured symbol values (e.g., I(N-2, I(N)) are used to calculate the error. In track mode, measured symbol sample values are replaced with corresponding actual symbol samples (based on the particular constellation in use). The measured intersymbol value (e.g., I(N-1)) may be used for both acquisition and track modes.

Figure 6:
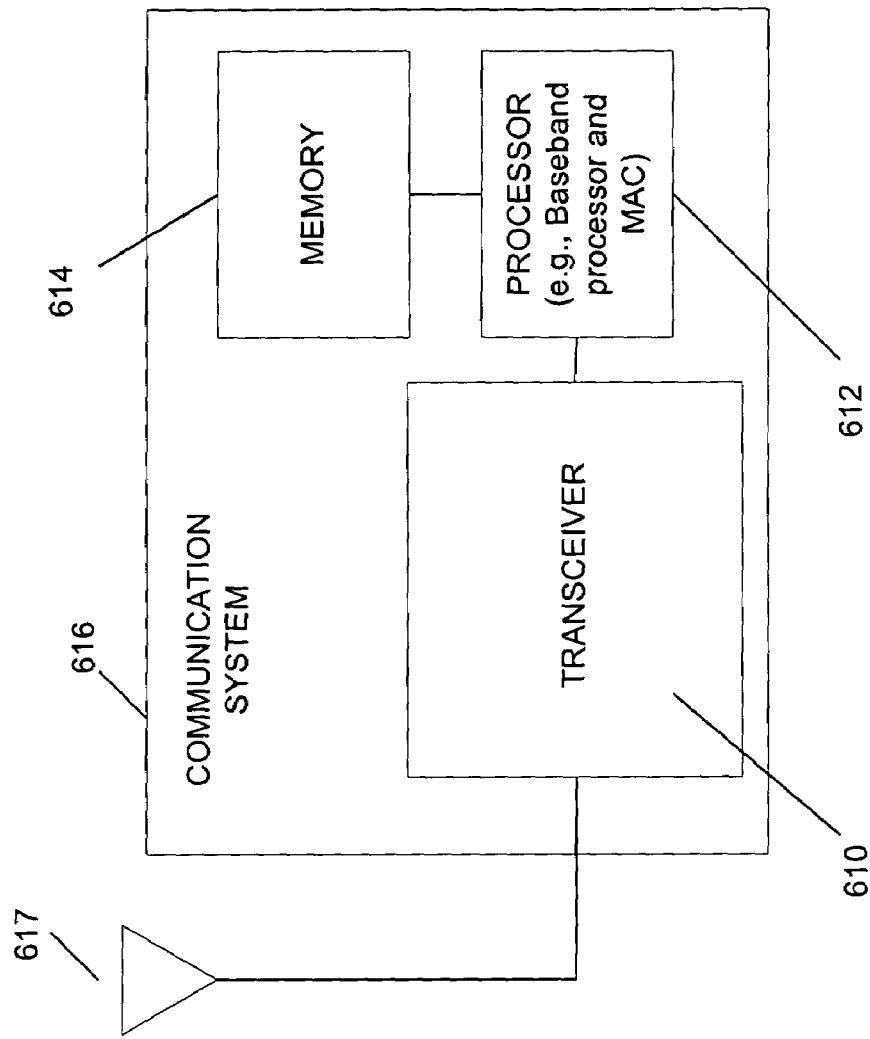
FIG. 6 is a diagram illustrating an example of a communication system in accordance with an example embodiment.

FIG. 6 is a diagram illustrating an example of a communication system in accordance with one embodiment of the invention. The communication system 600 (FIG. 6), and various example embodiments described herein, may be used in a variety of systems and equipment such as demodulators, receivers, transceivers and in a variety of applications, including wireless and wireline communications. For example, the various timing error detection techniques described herein may be advantageously used in wireless LAN (WLAN), modems, cellular telephone systems, digital television, digital broadcasting, baseband transmission, and the other technologies, although the invention is not limited thereto.

In the communication system 600 shown in FIG. 6, a user communication system 616 may include a transceiver 610, which may include a transmitter and receiver. The transmitter may include a modulator for modulating signals, and, the receiver may include a demodulator for demodulating signals. The demodulator used in transceiver 610 may be, for example, the demodulator 300 (FIG. 3), which may include a timing error detector (TED) 318, as described above.

Transceiver 610 may be coupled to an antenna 617 (for a wireless transceiver) and to a processor 612. Antenna 617 may not be required for wireline applications. Processor 612 in one embodiment may comprise a single processor, or alternatively may comprise a baseband processor and an applications processor, although the scope of the invention is not limited in this respect. According to an example embodiment, processor 612 may include a baseband processor and Medium Access Control (MAC).

Processor 612 may be coupled to a memory 614 Which may include volatile memory such as DRAM, non-volatile memory such as flash memory, or alternatively may include other types of storage such as a hard disk drive, although the scope of the invention is not limited in this respect. Some portion or all of memory 614 may be included on the same integrated circuit as processor 612, or alternatively some portion or all of memory 614 may be disposed on an integrated circuit or other medium, for example a hard disk drive, that is external to the integrated circuit of processor 612, although the scope of the invention is not limited in this respect. According to one embodiment, software may be provided in memory 614 to be executed by processor 612 to allow system 616 to perform a variety of tasks.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
   a timing error detector to detect a timing error for symbol sampling, the timing error detector to detect an amount of timing error based upon a value of an intersymbol sample as compared to an average value of a plurality of symbol samples, wherein the apparatus is adapted to apply a correction to the timing of symbol sampling if the amount of timing error exceeds a threshold;

wherein the timing error detector is adapted to detect an amount of timing error based upon an average of the values for first and second symbol samples minus a value of an intersymbol sample between the first and second symbol samples.

2. The apparatus of claim 1 wherein the timing error detector is adapted to detect an amount of timing error based upon a value of an intersymbol sample minus an average value of a plurality of symbol samples, the intersymbol sample located between at least two of the plurality of symbol samples.

3. The apparatus of claim 1 wherein the first sample is a sample of a first symbol, and the second sample is of a second symbol, the first and second symbols being successive symbols, and the intersymbol sample being a sample taken between the first and second symbol samples.

4. The apparatus of claim 1 wherein the timing error detector is adapted to interpolate or estimate a value of the intersymbol sample based on one or more other sample values.

5. The apparatus of claim 1 wherein the timing error detector is adapted to measure the value of the intersymbol sample at a sampling point that is approximately mid-way between the first and second symbol samples.

6. The apparatus of claim 1 wherein the timing error detector is adapted to sign normalize the amount of timing error based on one or more of the signs of the first and second symbol samples.

7. The apparatus of claim 1 wherein the timing error detector is adapted to sign normalize the amount of timing error by multiplying the amount of timing error by the sign of the value of one of the symbol samples.

8. The apparatus of claim 1, wherein the apparatus further comprises a demodulator.

9. The apparatus of claim 1 wherein the apparatus further comprises a transceiver.

10. The apparatus of claim 1 wherein the timing detector is adapted to first determine whether there has been a sign change, either positive to negative or negative to positive from the values of the first and second symbol samples before detecting the amount of timing error.

11. The apparatus of claim 1 wherein the timing error detector is adapted to detect an amount of timing error for both in-phase (I) and quadrature (Q) signals.

12. An apparatus comprising:
a timing error detector to detect a timing error for symbol sampling, the timing error detector adapted to detect an amount of timing error based upon an average of the values for first and second symbol samples minus a value of an intersymbol sample taken between the first and second symbol samples, wherein the apparatus is adapted to apply a correction to the timing of symbol sampling if the amount of timing error exceeds a threshold.

13. The apparatus of claim 12 wherein the timing error detector is adapted to detect an amount of timing error based upon one half of the sum of the values for first and second symbol samples, as compared to a value of the intersymbol sample between the first and second symbol samples.

14. The apparatus of claim 12 wherein the timing error detector is adapted to detect an amount of timing error for both in-phase (I) and quadrature (Q) signals.

15. An apparatus comprising:
a timing error detector to detect an amount of timing error for symbol sampling, the timing error detector adapted to determine whether there has been a sign change, either positive to negative or negative to positive, from the values of first and second symbol samples, and if so, then to detect an amount of timing error based upon the difference between:
an average of the values for first and second symbol samples; and
the value of an intersymbol sample between the first and second symbol samples;
wherein the apparatus is adapted to apply a correction to the timing of symbol sampling if the amount of timing error exceeds a threshold.

16. An apparatus of claim 15 wherein the apparatus comprises a demodulator.

17. The apparatus of claim 15 wherein the intersymbol sample is taken at a point that is approximately mid-way between the first and second symbol samples.

18. The apparatus of claim 15 wherein the timing error detector is adapted to estimate or interpolate the intersymbol sample based upon a plurality of samples.

19. An apparatus comprising:
an analog-to-digital (A/D) converter to convert an analog signal to a digital signal;
at least one mixer coupled to the to A/D converter to provide digital data signals; and
a timing error detector to detect an amount of timing error for symbol sampling, the timing error detector adapted to detect an amount of timing error based upon the difference between a value of an intersymbol sample and an average of a plurality of symbol samples;
wherein the apparatus is adapted to apply a correction to the timing of symbol sampling if the amount of timing error exceeds a threshold;
wherein the timing error detector is adapted to detect an amount of timing error based upon the difference between an average of the values for first and second symbol samples and a value of an intersymbol sample taken between the first and second symbol samples.

20. The apparatus of claim 19 wherein the apparatus comprises a quadrature demodulator, the at least one mixer comprising two mixers to provide in-phase (I) and out-of-phase (Q) signals.

21. The demodulator of claim 20 wherein the timing error detector is adapted to detect an amount of timing error for both I and Q signals, the total timing error being based on the timing error for both I and Q signals.

22. The demodulator of claim 21 wherein the demodulator is adapted to apply a correction to the timing of symbol sampling if the sum of the amount of timing errors for I and Q signals exceeds a threshold.

23. A demodulator comprising:
an analog-to-digital (A/D) converter to convert an analog signal to a digital signal;
at least one mixer coupled to the to A/D converter provide digital data signals;
an equalizer coupled to an output of the at least one mixer;
a timing error detector to detect an amount of timing error for symbol sampling, the timing error detector adapted to detect an amount of timing error based upon the difference between:
a value of an intersymbol sample; and
an average of first and second symbol samples, the intersymbol sample taken between the first and second symbol samples; and an averaging circuit coupled to the timing error detector to average a plurality of detected timing errors;

wherein the demodulator is further adapted to apply a correction to the timing of symbol sampling if the amount of timing error exceeds a threshold.

24. A demodulator of claim 23 wherein at least a portion of the demodulator is operable in two modes:

wherein in a first mode the timing error detector to detect an amount of timing error by using measured values for symbol samples and a measured value for the intersymbol sample; and wherein in a second mode the timing error detector to detect an amount of timing error by using actual values for symbol samples and a measured value for the intersymbol sample.

25. The demodulator of claim 24 wherein the first mode comprises an acquisition mode, and the second mode comprises a tracking mode.

26. A communication system comprising:

a transceiver, the transceiver including a timing error detector, the timing error detector adapted to detect an amount of timing error based upon the difference between a value of an intersymbol sample and an average of first and second symbol samples;

a processor coupled to the transceiver;

a memory coupled to the processor;

wherein the communication system is adapted to apply a correction to the timing of symbol sampling if the amount of timing error exceeds a threshold.

27. The system of claim 26 and further comprising an antenna coupled to the transceiver.

28. The system of claim 26 wherein the memory comprises flash memory.

29. A method comprising:

detecting a timing error for symbol sampling based upon a value of an intersymbol sample as compared to an average of a plurality of other samples, determining whether the amount of error exceeds a threshold and adjusting the timing of symbol sampling based on the amount of error, if the amount of error exceeds the threshold;

wherein the detecting comprises detecting an amount of timing error based upon a value of an intersymbol sample minus an average of a plurality of symbol samples, the intersymbol sample taken between at least two of the plurality of symbol samples.

30. The method of claim 29 wherein the detecting comprises detecting an amount of timing error based upon a value of an intersymbol sample minus an average of the values for first and second symbol samples, the intersymbol sample taken between the first and second symbol samples.

31. The method of claim 30 wherein the first symbol sample is a sample of a first symbol, and the second symbol sample is of a second symbol, the first and second symbols being consecutive or successive symbols, and the intersymbol sample being a sample taken between the first and second symbol samples.

32. The method of claim 29 wherein the value of the intersymbol sample is interpolated or estimated based on one or more other sample values.

33. The method of claim 29 wherein the value of the intersymbol sample is measured at a sampling point approximately mid-way between the first and second symbol samples.

34. The method of claim 29 wherein the amount of timing error is to be sign normalized based on the sign of the value of one of the symbol samples.

35. A method comprising:

detecting a timing error for symbol sampling based upon a difference between a value of an intersymbol sample and an average of first and second symbol samples, the first and second symbol samples being taken from first and second consecutive symbols, respectively, and the intersymbol sample being approximately mid-way between the first and second symbol samples, averaging the amount of timing error over a period of time or over a number of symbols, determining whether the average error exceeds a threshold, and adjusting the timing of symbol sampling based on the amount of error, if the amount of error exceeds the threshold.

36. The method of claim 35 wherein the value of the intersymbol sample is interpolated or estimated based on one or more other sample values.

* * * * *